United States Patent [19]
Schulz et al.

[11] Patent Number: 5,651,944
[45] Date of Patent: Jul. 29, 1997

[54] APPARATUS FOR DEGASSING THERMOPLASTIC SYNTHETIC PLASTICS MATERIAL

[76] Inventors: Helmuth Schulz, Badstrasse 20; Helmut Bacher, Bruck/Hausleiten 17, both of St. Florian; Georg Wendelin, Waldbothenweg 84, Linz, all of Austria, A-4490

[21] Appl. No.: 537,836

[22] PCT Filed: Jun. 8, 1994

[86] PCT No.: PCT/AT94/00075

§ 371 Date: Oct. 25, 1995

§ 102(e) Date: Oct. 25, 1995

[87] PCT Pub. No.: WO94/29097

PCT Pub. Date: Dec. 22, 1994

[30] Foreign Application Priority Data

Jun. 8, 1993 [AT] Austria ..................... 1111/93
Mar. 1, 1994 [AT] Austria ..................... 433/94

[51] Int. Cl.⁶ ........................................... B29C 47/76
[52] U.S. Cl. .................. 422/137; 42/228; 42/229; 366/83; 366/85; 366/88
[58] Field of Search ............... 422/137, 228, 422/229; 366/83, 85, 88

[56] References Cited

U.S. PATENT DOCUMENTS

| | | |
|---|---|---|
| 3,360,824 | 1/1968 | Schippers . |
| 3,619,145 | 11/1971 | Crawford et al. ............ 422/137 |
| 3,684,252 | 8/1972 | Nissle et al. . |
| 3,836,336 | 9/1974 | Yasui et al. ............ 422/137 |
| 4,186,047 | 1/1980 | Salmon . |
| 4,423,960 | 1/1984 | Anders ............ 366/75 |
| 4,902,455 | 2/1990 | Wobbe ............ 264/40.7 |
| 5,141,426 | 8/1992 | Capelle ............ 425/203 |
| 5,358,693 | 10/1994 | Brinkmann et al. ............ 422/137 |

FOREIGN PATENT DOCUMENTS

| | | |
|---|---|---|
| 0102400 | 3/1984 | European Pat. Off. . |
| 0119029 | 9/1984 | European Pat. Off. . |
| 1360959 | 5/1964 | France . |
| 2 031 935 | 1/1972 | Germany . |
| 2 237 190 | 2/1974 | Germany . |
| 2 438 927 | 3/1975 | Germany . |
| 564809 | 3/1993 | Japan . |
| 927501 | 5/1963 | United Kingdom . |
| 9304841 | 3/1993 | WIPO . |

*Primary Examiner*—Nina Bhat
*Attorney, Agent, or Firm*—Salter & Michaelson

[57] ABSTRACT

An apparatus for degassing thermoplastic synthetic plastics material has a first screw section (11) for the intake of the material to be treated. The plasticized synthetic plastics material flows from the housing (10) of this screw section (11) through a connection channel (15) to a filter (16) and from there through an inflow opening (17) into the housing (18) of a second screw section (19) which conveys the material to an outlet (21). Between the two coaxial screw sections (11, 19), a sealing section (26) is disposed which avoids a by-pass of the filter (16). A baffle member (28) is disposed in front of the inflow opening (17) which forces the synthetic plastics material stream into a hose-formed shape. The baffle member (28) is displaceable with respect to the inflow opening (17) in axial direction and has a cross section which tapers towards the second screw section (19). Thereby the migration path of the gas bubbles from the synthetic plastics material is reduced and thereby degassing via the degassing openings (20) is enhanced. (FIG. 1)

20 Claims, 4 Drawing Sheets

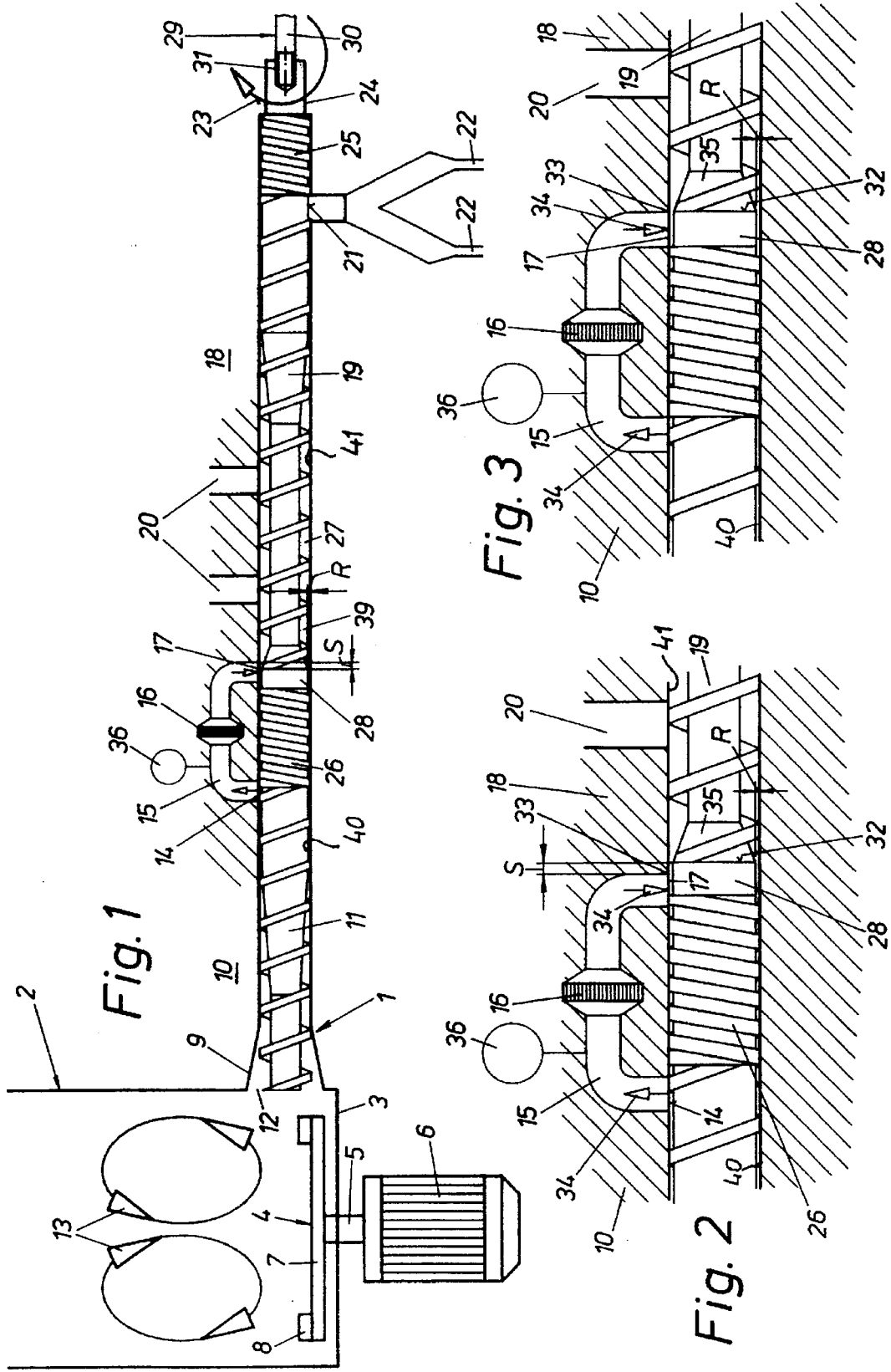

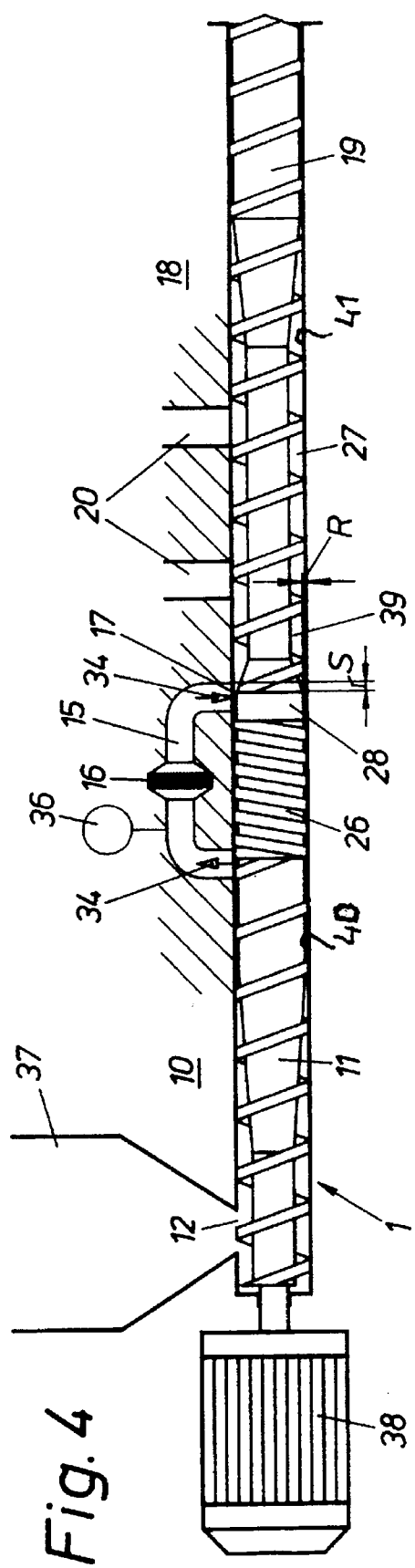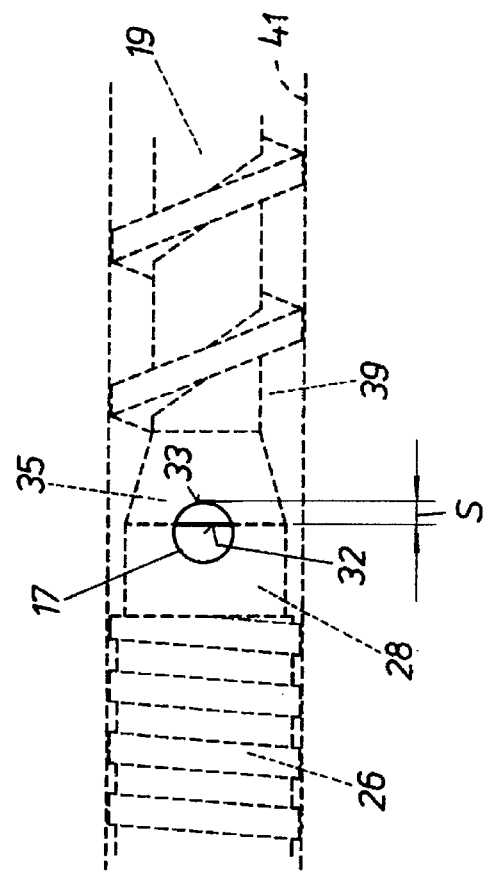

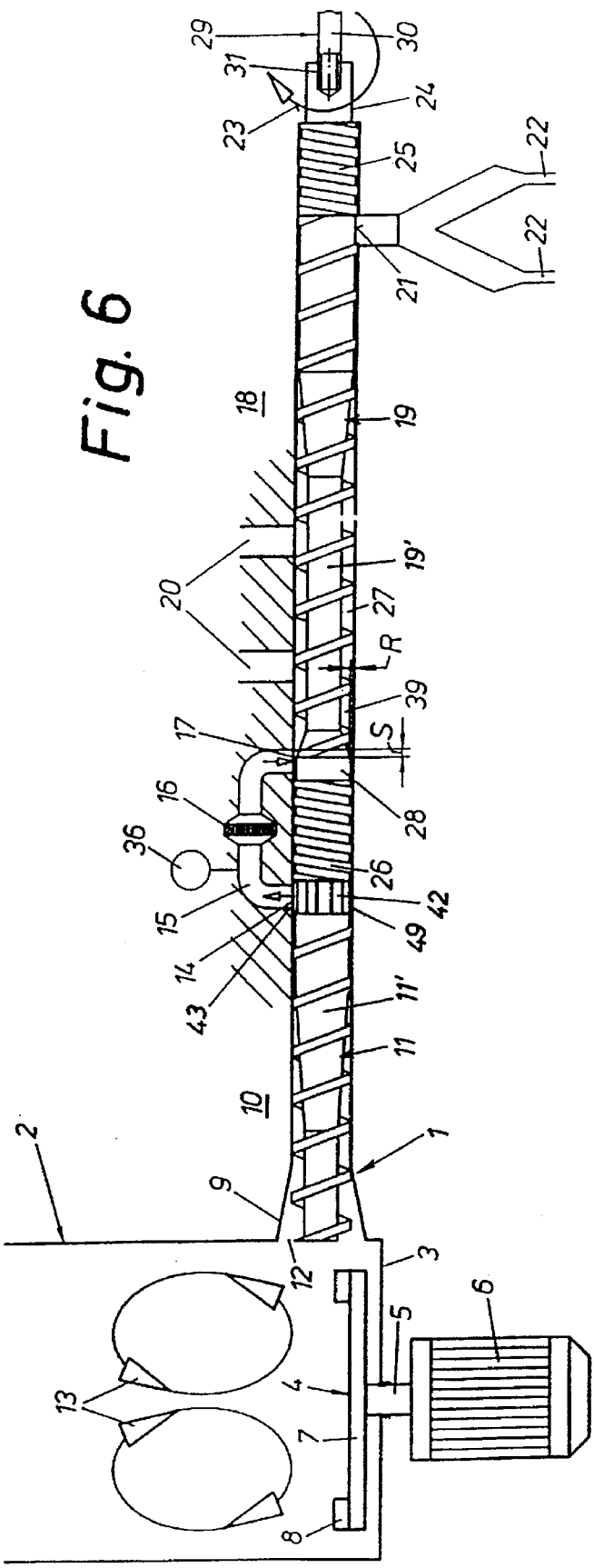

APPARATUS FOR DEGASSING THERMOPLASTIC SYNTHETIC PLASTICS MATERIAL

BACKGROUND AND SUMMARY OF THE INVENTION

The invention relates to an apparatus for degassing thermoplastic synthetic plastics material which is supplied through at least one intake opening into a housing of a first screw section, at the end of which the plasticized synthetic plastics material is pressed into at least one connection channel in which at least one filter for the synthetic plastics material is disposed, from which the synthetic plastics material streams to an upstream opening of a housing of a second screw section which is disposed coaxially to the first screw section and conveys the synthetic plastics material along a degassing region provided with at least one degassing opening to an exit, a sealing section being interposed between the two screw sections which avoids bypassing of the connection channel, the two screw sections and the sealing section being bearingly supported in bores of the housings having equal diameters.

Such an apparatus has become known from a prior suggestion of the inventors (WO 93/04841). This known apparatus enables one to clean thermoplastic synthetic plastics material in plasticized condition by means of the filter and then to degas it, however it is sensitive with respect to disposal of the opening through which the plasticized synthetic plastics material, after having passed the filter, flows into the second screw section. Further, some kinds of synthetic plastics material are only incompletely degassed, inasmuch the synthetic plastics material is subject to turbulences when passing the filter, so that gas inclusions are worked into the interior of the synthetic plastics material rope. Investigations of the applicants have been shown that the problems when degassing are based on the fact that the migration path for the gas bubbles in the degassing region is too long. It is possible to counteract this by operating the screw in the degassing region with a reduced speed so that the synthetic plastics material passes the degassing region comparatively slow. However, this has the disadvantage that the throughput of the apparatus is unsufficient. Another possibility is to make the degassing region comparatively long, what has the disadvantage of a considerable entire length of the apparatus.

The invention has at its object to avoid these disadvantages and to improve degassing at an apparatus of the initially described kind without that the throughput of the apparatus is substantially reduced and without that the constructional length of the apparatus is increased. The invention solves this task by the features that in the housing of the second screw section at least one baffle member for the synthetic plastics material flow is provided between the upstream opening and the degassing openings, which baffle member forces the synthetic plastics material stream into a hose-formed shape and is adjustable with respect to the upstream opening, the baffle member being disposed so in front of the upstream opening that the synthetic plastics material streaming from the upstream opening into the housing of the second screw section hits directly the periphery of the baffle member which is disposed axially spaced apart from the nearest degassing opening and has a cross section tapering towards the second screw section. This baffle member forms a radial gap between its periphery and the inner surface of the housing of the second screw section, which gap as a rule is so narrow that through this gap so to speak a hose-shaped synthetic plastics material film having a small wall thickness is extruded. This hose-shaped synthetic plastics material stream is taken along by the second screw section and is conveyed further in the degassing section, the small wall thickness of this synthetic plastics material film causes a short migration path for the gas bubbles and thereby an efficient degassing, even if the screw revolves with a comparatively high speed. Within this it is of advantage that already filtered synthetic plastics material is supplied to the region of the baffle member, so that foreign matter cannot adversely affect the gap formed between the baffle member and the screw housing. On the other hand, it is efficiently counteracted to the inclusion of the gas bubbles caused by the filter, and this by the fact that the synthetic plastics material which shows gas inclusions caused by the filter, after being supplied again into the housing of the second screw section, at first streams around the baffle member and substantially only then is conveyed further by the screw of the second screw section. This flow around the baffle member offers to the gas inclusions a longer period of time for loosening from the synthetic plastics material. Therefore, the time interval which is at disposal for the gas inclusions to leave the synthetic plastics material, is increased so that also comparatively long migration paths of the gas inclusions are taken into account.

Within constructions of another kind, baffle members are known which give the synthetic plastics material rope supplied by a screw a hose-shaped form in order to increase degassing (DE-A 2,237,190, DE-A 2,031,935, EP-A 119,029). Within the known constructions, however, no filtering of the synthetic plastics material is provided so that the object on which the invention is based, does not exist there.

Basically, some baffle members may be provided within the spirit of the invention, which are disposed one behind the other, when seen in conveyance direction of the synthetic plastics material. If desired, also a baffle member composed from a plurality of sections may be used. Preferably however, within the spirit of the invention only one single baffle member is provided, around which the synthetic plastics material which enters the housing of the second screw section, flows in the region of the inlet opening, so that the synthetic plastics material is transferred into its hose-like shape.

According to a preferred embodiment of the invention, the screw threads of the second screw section reach up into the region between the baffle member and the nearest degassing opening, preferably the screw threads immediately neighbour the baffle member. Thereby it is avoided that the synthetic plastics material hose collapses again or, respectively, that substantial thickenings of the synthetic plastics material after its formation into its hose-like shape, may occur, what would hinder the degassing effect.

By adjustment of the baffle member in axial direction of the two screw sections, the effective cross section of the inlet opening can be changed, if the tapered section of the baffle member comes into the region of this inlet opening. The circumstances of forming the hose-shaped synthetic plastics material film, therefore, can be influenced at choice, in particular the wall thickness of this film. Within this, it is particularly favourable within the spirit of the invention, to give the tapered cross section of the baffle member the shape of a conical section of the baffle member, that is a frusto-conical surface. This on the one hand favours loosening of the synthetic plastics material film from the baffle member, on the other hand there is the possibility, as already mentioned, to steadily continuously change the radial width of the annular gap formed between the periphery of the baffle member and the inner surface of the housing of the second screw section by axial displacement of the baffle member. Within this, it is particularly favourable within the spirit of the invention, if the baffle member—when seen in flow direction of the synthetic plastics material—is connected to the core of the screw threads of the second screw section. If so, the baffle member rotates with the neighbouring screw, what favours the distribution of the synthetic plastics material supplied through the inlet opening to the shape of a hose. Furthermore, the advantage is obtained that the axial displacement of the baffle member can be made by means of the neighbouring screw, and for this according to the invention the construction is so chosen that the second screw section connected to the baffle member is shiftable in its axial direction, preferably by means of a screw engaging the front end of this screw section. Alternatively, however, within the spirit of the invention the construction can also be chosen so that the baffle member is axially displaceably disposed on the second screw section and is connected to a separate adjustment means. Also within such a construction the feature can be maintained that the baffle member rotates together with the neighbouring screw section.

It is of particular advantage within the spirit of the invention, if the baffle member is detachably connected to the second screw section and can be exchanged with baffle members of different dimensions. Thereby, the conditions at the inlet opening can be changed at choice and can be adjusted to the given requirements of the material.

Investigations of the inventors have further shown that problems may arise if the synthetic plastics material supplied to the first screw section is only incompletely comminuted, so that bigger pieces or shreds remain in this material which are only incompletely plasticized by the first screw section before they are pressed into the connection channel. Such portions of the synthetic plastics material which are not completely plasticized may block the connection channel or the filter inserted into it. The same can be caused by foreign bodies contained in the synthetic plastics material, for example metal pieces or stones, textile portions and the like. Such an obstruction in the connection channel or a blocking of the filter causes a decrease of the synthetic plastics material flow in the section of the connection channel following the filter, and thereby also in the inlet opening leading the synthetic plastics material to the baffle member, whereby forming of the synthetic plastics material hose could be impared or destroyed. In order to overcome these difficulties, according to a further embodiment of the invention the construction is so chosen that in the region of the first screw section neighbouring the inlet opening of the connection channel the screw is provided with teeth comminuting the material conveyed by it. These teeth which rotate together with the first screw section, comminute the synthetic plastics material disposed in front of the inlet end of the connection channel and also the impurities contained in it, and this just at the critical location. By the teeth the unplasticized synthetic plastics material portions as well as bigger foreign body portions of the material entering the connection channel are so comminuted that this channel cannot more be plugged. If the particles obtained by the comminution are not so small that they can pass the filter, they are collected by the filter and are removed from the apparatus when the filter is exchanged.

According to a preferred variant of the embodiment, the teeth are formed in one single piece with the core of the screw section. Therefore, they are worked from the material of this core. For manufactoring reasons, however, it is easier according to the preferred embodiment of the invention, if the teeth are provided on a separate carrier member which is connected for common rotation with the core of the screw section. This carrier member, for example, can be screwed to the core of the screw section.

Preferably within the spirit of the invention the teeth are formed as ribs which extend up to the inner surface of the housing of the screw section. These ribs, so to say, mill the material to be comminuted. They may extend parallel to the axial direction of the screw section, however, if desired, also along helix lines or the like, whereby an oblique cut onto the material to be comminuted is obtained. Particular favourable results are obtained within the spirit of the invention, if the teeth overlap the inlet opening entirely, when seen in axial direction of the screw section, preferably overdimensioned before and behind. Then, when seen from above, the inlet opening is completely covered by the teeth, and the teeth cooperate with the edge of the inlet opening, which edge acts as a shearing edge. In order to optimally meet the stresses occuring there, within the spirit of the invention, a wearing part is inserted into the wall of the inlet opening.

Further features and advantages of the invention can be seen from the description of examplative embodiments, schematically shown in the drawings.

BRIEF DESCRIPTION OF THE DRAWINGS

FIG. 1 shows a longitudinal section through a first embodiment. FIG. 2 shows a detail of FIG. 1 in an enlarged scale and in a position of the baffle member different from that of FIG. 1. FIG. 3 shows, similar to FIG. 2, in an enlarged scale the conditions at the inlet opening, the baffle member being shown in an again changed position. FIG. 4 is an axial section through an embodiment variant and FIG. 5 is a cross section through the inlet opening of FIG. 1 in an enlarged scale. FIG. 6 shows a further embodiment in a longitudinal section.

DETAILED DESCRIPTION OF THE INVENTION

Figure 7:
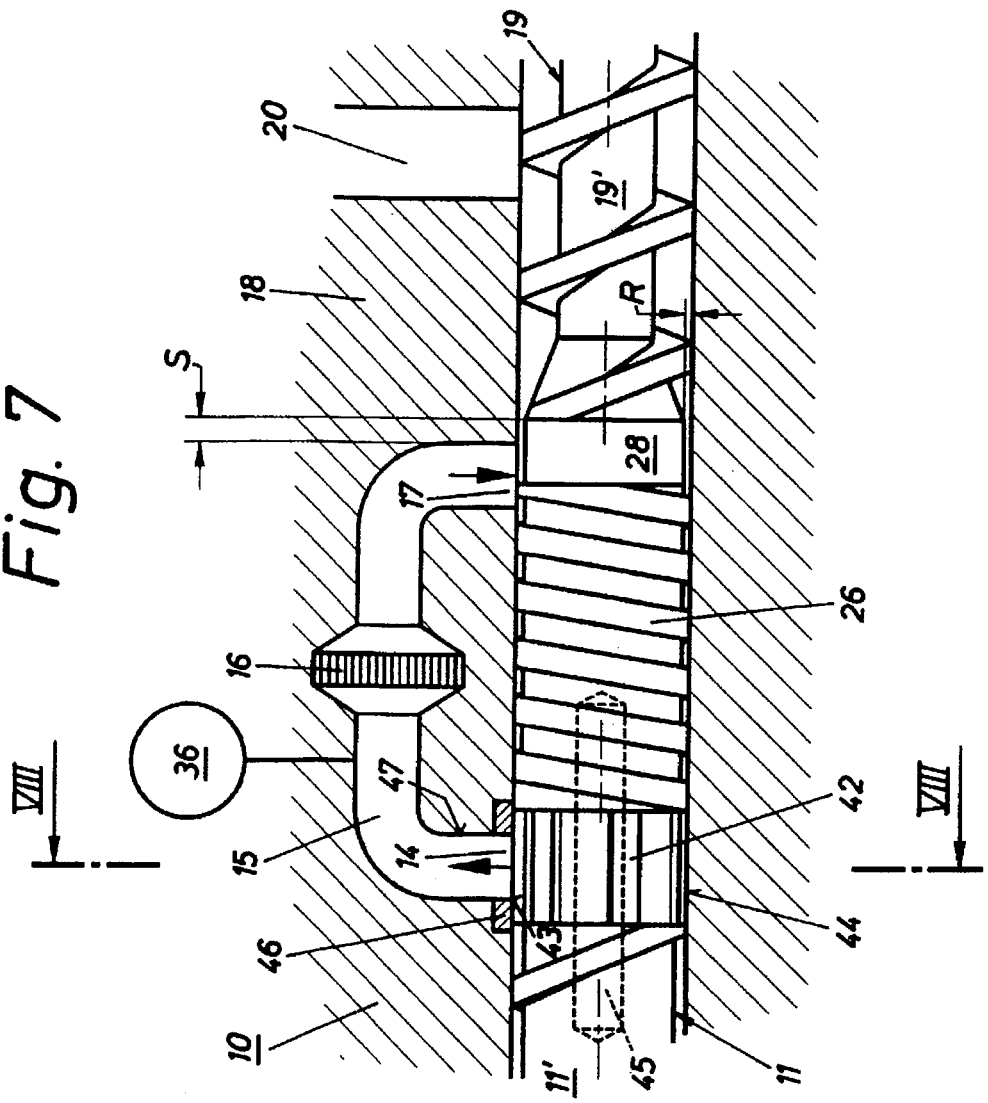
FIG. 7 shows in an enlarged scale a detail of an embodiment variant thereof.

Within the embodiment according to FIGS. 1, 2, 3 and 5 the apparatus 1 comprises a pot-like receptacle 2 into which the synthetic plastics material to be treated is filled in from above. In the region of the bottom 3 of the receptacle 2 a tool 4 is bearingly supported in a known manner for rotation around a vertical axis which is centrally disposed with respect to the receptacle 2, and this tool is driven for rotation by a motor 6 and a shaft 5 which intersects the bottom 3. The tool has at least two radial arms 7 which suitably are provided with working edges 8 formed as cutting edges, which act onto the synthetic plastics material. These working edges mix the supplied synthetic plastics material and, if desired, also comminute it. The so treated synthetic plastics material reaches an intake funnel 9 of a housing 10 of a first screw section 11. This screw section 11 extends into the opening 12 formed by the intake funnel 9. When the tools 4 rotate around the axis of the shaft 5, the synthetic plastics material circulating within the receptacle 2 rises in form of a mixing cone along the walls of the receptacle 2, what is indicated by arrows 13. The centrifugal force acting onto the circulating synthetic plastics material assists the intake of the synthetic plastics material through the opening 12 into the housing 10 of the screw 11, which housing preferably is substantially radially connected to the receptacle 2. Instead of this, the screw housing 10 can also be substantially tangentially connected to the receptacle 2.

The core diameter of the first screw section 11 increases in direction away from the opening 12, whereby the synthetic plastics material taken up by the screw section 11 is compressed and plasticized. The plasticized material leaves the housing 10 of the first screw section 11 through an opening 14 and enters a connection channel 15 and flows in this to at least one filter 16, which separates the impurities contained in the synthetic plastics material melt. Suitably this polymere filter 16 comprises filter inserts, which can be backwashed and exchanged or, respectively, is so constructed that also during the backwashing operation or during a sieve exchange a continuous operation of the apparatus 1 is possible. After having passed the filter 16, the plasticized synthetic plastics material enters a further section of the connection channel 15, which debouches via an inflow opening 17 into the interior of a further housing 18, in which a second screw section 19 is bearingly supported for rotation. This second screw section 19 conveys the plasticized synthetic plastics material in a degassing section past two degassing openings 20 by which the gasses which have been left the synthetic plastics material can be conveyed off, collected and, if desired, supplied to further use. After having passed these degassing openings 20, the synthetic plastics material reaches an outlet 21 to which tools may be connected, for example extruder heads 22 leading to moulds or granulating devices.

Suitably, the two screw sections 11, 19 are bearingly supported in bores 40 or 41, respectively, of the two housings 10 or 18, respectively, which bores are disposed coaxially with respect to each other and have equal diameters. The coaxial disposal of the two screw sections 11, 19 enables one in a simple manner to combine these two screw sections 11, 19 to one single member having a common core and to drive the two screw sections 11, 19 from the tip-side of the second screw section 19 in common, that means from the right-hand-side in FIG. 1. The direction of revolution of the two screw sections 11, 19 has been indicated by an arrow 23. A stud 24 is driven by the drive means for the screws, which is not shown, for example by means of a toothed belt. A further screw section 25 is disposed between the outlet 21 and this stud 24, which screw section comprises screw volutions, the pitch direction thereof is opposite to that of the two screw sections 11, 19, so that this screw section 25 seals towards the outside. A further sealing formed by a screw section 26 having screw volutions of opposite pitch is disposed between the two screw sections 11, 19 and avoids that synthetic plastics material can by-pass the connection channel 15 and can reach the housing 18 directly from the housing 10.

In order to enhance degassing of the treated synthetic plastics material in the housing 18, the screw section 19 has in the region between the inflow opening 17 and the—when seen in flowing direction of the synthetic plastics material—last degassing opening 20 a zone 27 of no pressure which is formed by a decreased core diameter of the screw section 19. Behind the last degassing opening 20 this reduced core diameter merges slowly into the complete core diameter which is present in the region of the outlet 21 for the purpose to again pressurize the synthetic plastics material and, therefore, to keep it sufficiently plasticized.

Degassing is further enhanced by the fact that a baffle member 28 is disposed in front of the inflow opening 17, which baffle member offers a certain resistance against supply of the synthetic plastics material from the inflow opening 17 into the housing 18 and forces the synthetic plastics material at the entry of the housing 18 into a hose-shaped shape. The outer diameter of this hose corresponds to the inner diameter of the bore 41 of the housing 18 in which the screw section 19 is bearingly supported. The inner diameter of this hose is defined by the outer diameter of the cylindric baffle member 28. The wall thickness of this hose is defined by the difference between the radii of the baffle member 28 and the housing 18 and depends from the circumstances given. For a diameter of the housing 18 of 100 mm it is suitable to choose this wall thickness (R in FIGS. 1 to 3) by about 0.5 to 3 mm. This dimension R can be changed by an exchange of the baffle member 28 against other baffle members having different dimensions. Within this, it is suitable to construct the entire screw constituted by the sections 11, 26, 19, 25 so that it can be dismounted to the right out of the housings 10, 18.

However, a change of the circumstances and an adaptation to different requirements of the material is also possible by making the baffle member 28 together with the screw sections carrying it adjustable in axial direction of the screw sections. For this, an adjustment means 29 (FIG. 1) is provided which engages the stud 24 and suitably is formed by a screw 30, which cannot be shifted in axial direction and can be screwed into screw threads 31 of the stud 24. By a relative turn of the screw 30 with respect to the stud 24, the entire screw construction constituted by the screw sections 11, 26, 19, 25 is adjusted in axial direction. The amount of this adjustment must be relatively small only, for a construction having a diameter of the housing 18 of 100 mm, this adjustment amount is suggested to be about 6 mm. The middle position is shown in FIG. 3 and is so chosen that the—when seen in flowing direction of the synthetic plastics material—upstream edge 32 of the cylindric baffle member 28 is flush with the upstream edge 33 of the inflow opening 17. The synthetic plastics material flowing in direction of the arrows 34, therefore, is forced after its escape from the inflow opening 17 to flow around the baffle member 28 in the shape of a ring before it reaches the region of the screw section 19 into which the baffle member 28 merges via a conical section 35.

For the above mentioned measures, the baffle member 28 can leave this middle position shown in FIG. 3 in both directions for about 3 mm. The displacement towards the left side is shown in FIG. 1, in which position a gap S (FIG. 5) remains between the edge 32 of the baffle member 28 and the front edge 33 of the inflow opening 17, through which gap the material can flow more freely than in FIG. 3 into the enterior of the housing 18, so that the wall thickness of the constituted synthetic plastics material film increases.

In FIG. 2 the other extreme position is shown in which the edge 32 of the baffle member 28 has passed the front edge 33 of the inflow opening 17 for the amount S. Now, the synthetic plastics material hose formed around the baffle member 28 must flow at first at least for the amount S in axial direction of the screw 19, before the so formed hose-shaped film reaches the region of the conical section 35.

In all cases the small wall thickness of the hose-shaped synthetic plastics material film has as a consequence that the migration path for the gas bubbles included within the synthetic plastics material is very small so that all gas bubbles leave the synthetic plastics material before the synthetic plastics material has been conveyed past the last degassing opening 20. Further, the fact that, when forming the synthetic plastics material hose the synthetic plastics material entering via the inflow opening 17 must at first stream around the baffle member 28, has as a consequence that the time interval is increased which is at disposal for the gas inclusions to reach the surface of the synthetic plastics material. In such a manner a reliable degassing of the synthetic plastics material is ensured. Suitably, the screw threads of the second screw section 19 neighbour the cylindric section of the baffle member 28, therefore they are also provided in the region of the conical section 35 of the baffle member. Thereby it is ensured, that the synthetic plastics material hose immediately after its formation is taken along by the screw threads and reliably is conveyed further.

Suitably, the inflow opening 17 is disposed near the right edge of the screw section 26 acting as a sealing, if desired in such a manner that this screw section 26 slightly overlaps the left-hand edge of the inflow opening 17, what is shown in FIG. 2 for the right-hand extreme position of the baffle member 28. Thereby it is ensured that the screw section 26 always receives filtered synthetic plastics material from the inflow opening 17 so that it is avoided that this screw section 26 revolves in a dry condition whereby the sealing section of this section could be reduced.

If desired, more than one baffle member 28 may be provided, however as a rule one single baffle member 28 is sufficient.

The baffle member 28 throttles the inflow of the synthetic plastics material through the inflow opening 17 into the housing of the screw section 19. Therefore, it cannot happen that there is an overflow within the no-pressure-zone 27, so that it is reliably avoided that synthetic plastics material escapes through the degassing openings 20, as long as the synthetic plastics material can sufficiently flow out through the outlet 21.

The adjustability or respectively, exchangability of the baffle member 28 enables one also to influence the pressure conditions within the connection channel 15 at choice. For measuring and controlling of this pressure, a pressure sensor 36 is connected to the connection channel 15, suitably in front of the filter 16. By this pressure sensor 36 also the soiling degree of the filter 16 can be monitored.

After degassing, the screw section 19 must overcome only the resistance of the extruder heads 22, to which for example granulating tools can be connected. Therefore, the screw section 19 can be formed by a short, deeply cut screw which consumes only few idle power.

Within the embodiment according to FIG. 4, filling and driving of the screw is different when compared with the embodiment according FIGS. 1 to 3. According to FIG. 4, the housing 10 is provided on its left-hand end on its upper side with the inlet opening 12 to which an intake funnel 37 for the synthetic plastics material is connected, which, if desired, may be pre-comminuted. The screw sections 11, 26, 19 which are united to one single constructional member, are driven on the left-side end, therefore from the filling end, by means of a motor 38. Besides of this, the construction may be substantially the same as shown in FIG. 1.

The inventive construction is suitable for degassing gas-containing thermoplastic synthetic plastics material of all kind, in particular for foamed polystyrene, for example "Styropor" (registered trademark), but also for degassing such synthetic plastics materials which tend to a gas formation when being heated, for example synthetic plastics materials which show printings or are soiled.

As already mentioned, also by an exchangability of the baffle member 28 an adaptation to different properties of the synthetic plastics material which has to be worked up, is possible. Within this, in particular baffle members 28 having different diameters are to be understood. These baffle members are connected to the neighbouring screw sections 26, 19 in a suitable manner, for example by means of threaded pegs, for common rotation and so that tensions are transmitted.

It would also be possible to support the baffle member 28 shiftably on the second screw section 19 and to connect it to a separate adjustment drive means by which the position of the baffle member 28 relative to the front end of the second screw section 19 neighbouring the inflow opening 17 can be changed. A construction suitable for this may consist in that the screw shaft of the second screw section 19 is formed as a hollow shaft in which an adjustment rod is guided which is connected to the baffle member 28 shiftably disposed on the screw section 19. This can be made so that the end section of the screw shaft of the screw section 19 carrying the baffle member 28 is provided with a longitudinal slot which is penetrated by a pin which connects the baffle member 28 to the adjustment rod.

In order to avoid, that the connection channel 15 becomes plugged, in particular by separation of coarse impurities, for example nails, small stones and the like, according to the embodiment of FIG. 6 the section 49 of the first screw section 11 neighbouring the inlet opening 14 of the channel 15 is formed as a milling cutter coaxial with respect to this screw section, that means that it is provided with teeth 42 comminuting these coarse impurities so that plugging of the channel 15 does no more occur. The comminuted impurities, however, reach the filter 16 where they are filtered out from the plasticized synthetic plastics material mass. According to the embodiment of FIG. 1, the teeth 42 of this milling cutter are worked out in one single piece from the material of the core 11' of the screw section 11. The cutting edges of the teeth 42 are disposed parallelly to the longitudinal axis of the screw section 11, and these cutting edges are longer than the diameter of the inlet opening 14, so that—when seen in axial direction of the screw sections 11, 19—the teeth 42 overlap the inlet opening 14 and protude in front and behind thereof. Thereby it is ensured that the teeth 42 remain fully effective, even if the screw section 11 is axially shifted. The sharp edge 43 of the inlet opening 14 cooperates with these teeth 42 by forming cooperating cutting edges, the edge 43, therefore, forms a shearing edge, as to say.

Figure 8:
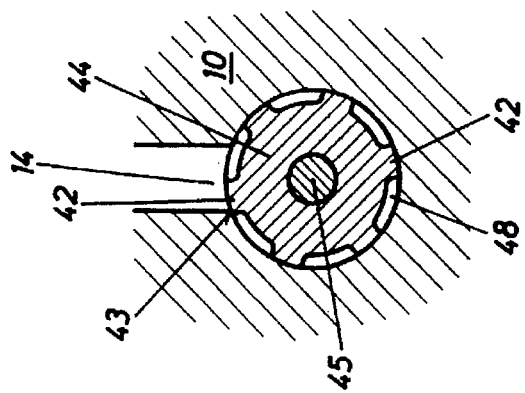
FIG. 8 is a section along the line VIII—VIII of FIG. 7.

The embodiment according to FIGS. 7 and 8 differs from that according to FIG. 6 mainly in that the teeth 42 which have the shape of longitudinal ribs (FIG. 3) are not worked out in one single piece from the material of the core 11' of the screw section 11, but are disposed on a separate carrier member 44 which is screwed to the core 11' of the screw section 11 or, respectively, to the core of the middle screw section 26. This screw connection 45 is so formed that it cannot be loosen when the screw sections 11, 19 are rotated in operation. In order to reduce the wear of the edge 43 forming the shearing edge, a wear member 46 is inserted into the wall 47 of the opening 14 and forms the edge 43 acting as a shearing edge.

As it is shown in FIG. 8, the ribs forming the teeth 42 may be comparatively broad for the purpose to meet the occuring shearing forces without any problem. The ratio between the widths of the teeth 42 and the interposed grooves 48 (when measured in peripheral direction) may be chosen within wide limits, in the embodiment shown this ratio amounts to about 1:2.

What is claimed is:

1. Apparatus for degassing thermoplastic synthetics material, which is supplied through at least one inlet opening (12) into a housing (10) of a first screw section (11), at the end of which the plasticized synthetic plastics material is pressed into at least one connection channel (15) in which at least one filter (16) for the synthetic plastics material is disposed, the synthetic plastics material after having passed this filter streams to an inflow opening (17) of a housing (18)

of a second screw section (19) which is disposed coaxially to the first screw section (11) and conveys a synthetic plastics material along a degassing region provided with at least one degassing opening (20) to an outlet opening (21), a sealing section (26) being interposed between the two screw sections (11, 19) which avoids bypassing of the connection channel (15), the two screw sections (11, 19) and the sealing section (26) being bearingly supported within bores (40, 41) of the housings (10, 18) having equal diameters, within the housing (18) of the second screw section (19), at least one baffle member (28) for the flowing synthetic plastics material being provided between the inflow opening (17) and the degassing openings (20), the baffle member (28) forcing the synthetic plastics material flow into a hose-formed shape and being adjustable with respect to the inflow opening (17), the baffle member (28) being disposed so in front of the inflow opening (17) that the synthetic plastics material streaming from the inflow opening (17) into the housing (18) of the second screw section (19) hits directly the periphery of the baffle member (28) which is disposed axially spaced apart from the nearest degassing opening (20) and has a cross section tapering towards the second screw section (19).

2. Apparatus according to claim 1, the screw volutions of the second screw section (19) extending into the region between the baffle member (28) and the nearest degassing opening (20).

3. Apparatus according to claim 2, the screw volutions being positioned immediately adjacent the baffle member.

4. Apparatus according to claim 2, the screw volutions being positioned at a peripheral surface of the baffle member.

5. Apparatus according to claim 1, the tapering cross section of the baffle member (28) being formed in shape of a conical section (35) of the baffle member (28).

6. Apparatus according to claim 1, the baffle member (28) being connected in front of the screw volutions of the second screw section (19) to its core in the flowing direction of the synthetic plastics material.

7. Apparatus according to claim 6, the second screw section (19) connected to the baffle member (28) being shiftable in its axial direction.

8. Apparatus according to claim 7, said second screw section being shiftable by means of a screw engaging the front end of the screw section.

9. Apparatus according to claim 1, the baffle member (28) being axially shiftably supported on the second screw section (19) and being connected to a separate adjustment means.

10. Apparatus according to claim 1, the baffle member (28) being detachably connected to the second screw section (19) wherein can be exchanged against the baffle members having different dimensions.

11. Apparatus according to claim 1, the baffle member (28) having a circular cylindrical section which forms with the wall of the neighboring housing (18) of the second screw section (19) a gap of 0.5 to 3 mm.

12. Apparatus according to claim 1, the front edge (32) of the baffle member (28) being flush with the front edge (33) of the inflow opening (17) in the flowing direction of the synthetic plastics material.

13. Apparatus according to claim 1, in the region (49) of the first screw section (11) neighboring the inlet opening (14) of the connection channel (15), the screw being provided with teeth (42) comminuting the material conveyed by it.

14. Apparatus according to claim 13, the teeth (42) being formed in one single piece with the core (11') of the screw section (11).

15. Apparatus according to claim 13, the teeth (42) being provided on a separate carrier member (44) which is connected for common rotation with the core (11') of the screw section (11).

16. Apparatus according to claim 13, the teeth (42) being formed as ribs extending up to the inner wall of the housing (10) of the screw section (11).

17. Apparatus according to claim 16, the ribs extending parallel to the axial direction of the screw section (11).

18. Apparatus according to claim 13, the teeth (42) overlapping the inlet opening (14) entirely in the axial direction of the screw section.

19. Apparatus according to claim 18, a wearing part (46) being inserted into the wall (47) of the inlet opening (14).

20. Apparatus according to claim 1, the front edge of the baffle member deviating from this position for the amount up to 3 mm towards the front side or towards the back side.

* * * * *